United States Patent
Chen et al.

(10) Patent No.: US 9,442,238 B2
(45) Date of Patent: Sep. 13, 2016

(54) BACKLIGHT MODULE

(71) Applicant: Primax Electronics Ltd., Neihu, Taipei (TW)

(72) Inventors: Bo-An Chen, Taipei (TW); Hsuan-Wei Ho, Taipei (TW)

(73) Assignee: Primax Electronics Ltd., Taipei (TW)

( * ) Notice: Subject to any disclaimer, the term of this patent is extended or adjusted under 35 U.S.C. 154(b) by 402 days.

(21) Appl. No.: 14/019,154

(22) Filed: Sep. 5, 2013

(65) Prior Publication Data

US 2014/0369067 A1 Dec. 18, 2014

(30) Foreign Application Priority Data

Jun. 17, 2013 (TW) .............................. 102121384 A

(51) Int. Cl.
*F21V 7/04* (2006.01)
*F21V 8/00* (2006.01)
*H01H 13/83* (2006.01)

(52) U.S. Cl.
CPC ............ *G02B 6/0021* (2013.01); *G02B 6/005* (2013.01); *G02B 6/0031* (2013.01); *G02B 6/0055* (2013.01); *H01H 13/83* (2013.01); *H01H 2219/06* (2013.01); *H01H 2219/062* (2013.01)

(58) Field of Classification Search
CPC G02B 6/0013; G02B 6/0055; G02B 6/0031; G02B 6/0035; G02B 6/0043

USPC .................................. 362/606, 607, 615, 623
See application file for complete search history.

(56) References Cited

U.S. PATENT DOCUMENTS

| | | | |
|---|---|---|---|
| 8,033,706 B1 * | 10/2011 | Kelly | .................... G02B 6/0036 362/307 |
| 2011/0158728 A1 † | 6/2011 | Ho | |
| 2012/0287355 A1 * | 11/2012 | Oya | ...................... G02B 6/0031 348/790 |

\* cited by examiner
† cited by third party

*Primary Examiner* — Andrew Coughlin
*Assistant Examiner* — Meghan Ulanday
(74) *Attorney, Agent, or Firm* — Kirton McConkie; Evan R. Witt

(57) ABSTRACT

A background module includes a light-emitting element, a light guide plate, and a light shielding structure. The light guide plate includes a reflective material layer. The reflective material layer is disposed on a top surface of the light guide plate and located near the light-emitting element. After a light beam emitted by the light-emitting element is introduced into the light shielding structure, a portion of the light beam is reflected back into the light shielding structure by the reflective material layer. On the other hand, a portion of the light beam is transmitted through the reflective material layer and absorbed by the light shielding structure. Consequently, the possibility of causing light leakage will be minimized.

12 Claims, 4 Drawing Sheets

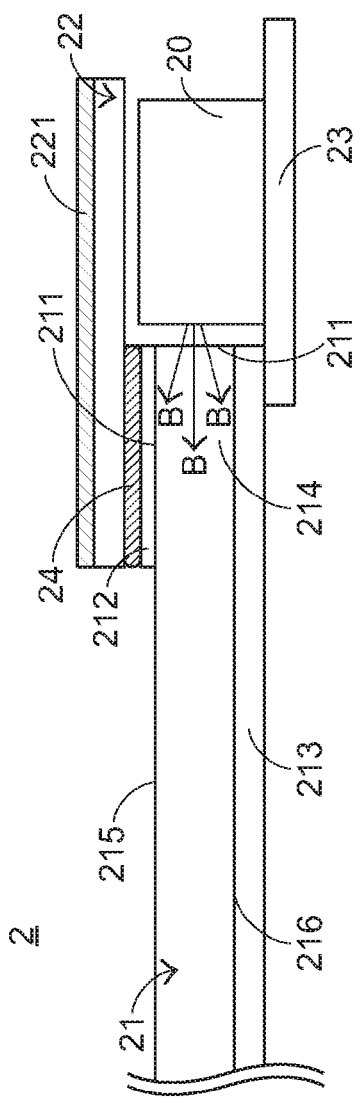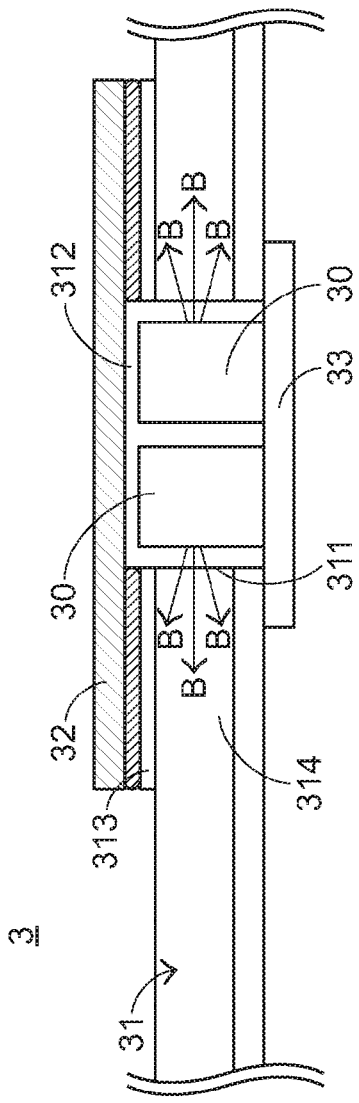

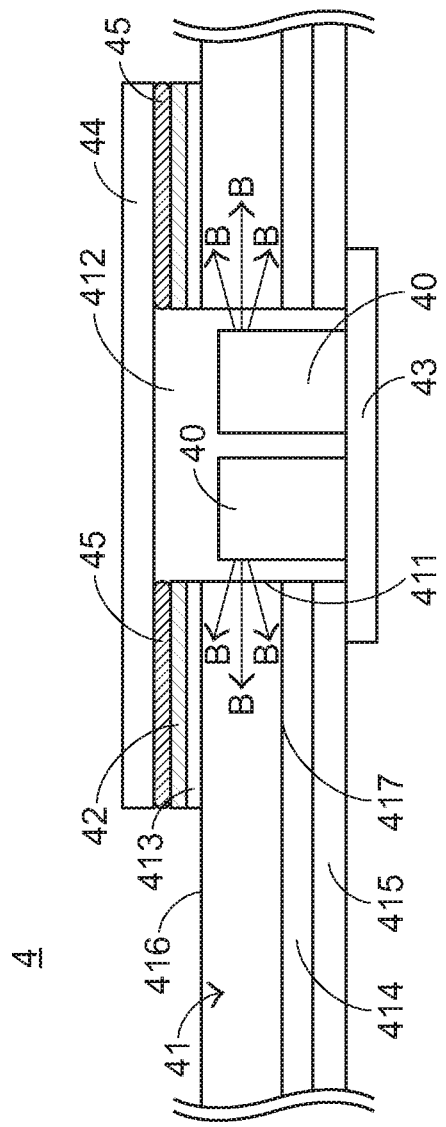

BACKLIGHT MODULE

FIELD OF THE INVENTION

The present invention relates to a backlight module, and more particularly to a backlight module for use in an electronic device.

BACKGROUND OF THE INVENTION

A backlight module is usually applied to a display device or a luminous input device. For example, most electronic devices are equipped with display devices for providing a prompting function. According to the contents shown on the display devices, the user may realize the current operating statuses of the electronic devices. Generally, a display device comprises a backlight module and a display panel. The backlight module is used for providing a light beam and guiding the light beam into the display panel. When the light beam is transmitted through the display panel, the corresponding content is shown on the display panel. On the other hand, the luminous input device comprises a backlight module and an input interface. The input interface is for example a keyboard device, a handwriting device or a touch panel. The backlight module is used for providing a light beam and guiding the light beam into the input interface. Consequently, the input interface has a luminous function, and the input interface is visible by the user.

Hereinafter, the structure of a conventional backlight module will be illustrated with reference to FIG. 1. FIG. 1 is a schematic side view illustrating a conventional luminous keyboard device. The conventional luminous keyboard device is disclosed in for example Taiwan Patent No. M419971. As shown in FIG. 1, the conventional luminous keyboard device 100 comprises a light guide plate 110, plural light sources 120, a transparent layer 130, a keycap layer 140, plural light intensity adjusting patterns 150, a reflective layer 160, and an adhering layer 170. The light guide plate 110 has plural openings 112. These openings 112 are located at predetermined positions of the light guide plate 110. Each light source 120 is aligned with a corresponding opening 112. In addition, each light source 120 is disposed within the corresponding opening 112. The transparent layer 130 is disposed over the light guide plate 110. The keycap layer 140 is disposed over the transparent layer 130. The plural light intensity adjusting patterns 150 are disposed on the transparent layer 130. The positions of the light intensity adjusting patterns 150 are determined according to the positions of the light sources 120.

The light source 120 is a light emitting diode or any other appropriate dot light source. The transparent layer 130 is made of polyethylene terephthalate (PET) or any other appropriate transparent material. Please refer to FIG. 1 again. After the light beams emitted by the light sources 120 of the luminous keyboard device 100 are introduced into the light guide plate 110, these light beams are transformed into a planar light beam. The planar light beam is transmitted through the transparent layer 130 overlying the light guide plate 110 and directed to the keycap layer 140. Consequently, plural keycaps (not shown) of the keycap layer 140 are illuminated.

FIG. 2 is a schematic top view illustrating the transparent layer, the light intensity adjusting patterns and the adhering layer of the conventional luminous keyboard device as shown in FIG. 1. Please refer to FIGS. 1 and 2. The light intensity adjusting patterns 150 are arranged between the transparent layer 130 and the keycap layer 140. The light intensity adjusting patterns 150 are partially disposed on the transparent layer 130 and located at the positions corresponding to the light sources 120. Moreover, the light intensity adjusting patterns 150 are arranged around corresponding light sources 120, respectively. By the light intensity adjusting pattern 150, a portion of the light beam near the light source 120 is blocked from being transmitted through the keycap layer 140. Consequently, the intensity of the portion of the light beam transmitted through the keycap layer 140 is not too strong. Under this circumstance, the luminous efficacy of the luminous keyboard device 100 is more uniform.

Generally, the light intensity adjusting pattern 150 is a white reflective pattern. By the light intensity adjusting pattern 150, the light beam from the light source 120 is reflected back into the light guide plate 110. Consequently, the light utilization efficacy is enhanced. Moreover, by the light intensity adjusting pattern 150, the light beam from the light source 120 is prevented from being directly projected onto the keycap layer 140 over the light source 120. Under this circumstance, the intensity of the light beam at local areas is not too strong. Alternatively, the light intensity adjusting pattern 150 is an opaque pattern. For example, the light intensity adjusting pattern 150 is a light-absorbing pattern by coating a black paint on the transparent layer 130. Consequently, the light beam from the light source 120 can be absorbed by the light intensity adjusting pattern 150, and the portion of the light beam to be transmitted through the keycap layer 140 is reduced. Consequently, the intensity of the light beam at the local area of the keycap layer 140 over the light source 120 is not too strong.

As shown in FIG. 1, the reflective layer 160 is disposed under the light guide plate 110. By the reflective layer 160, the light beam from a bottom surface of the light guide plate 110 is reflected back into the light guide plate 110. In other words, the use of the reflective layer 160 can enhance the light utilization efficacy. Moreover, the adhering layer 170 is arranged between the keycap layer 140 and the transparent layer 130. Via the adhering layer 170, the keycap layer 140 and the transparent layer 130 are combined together. As shown in FIG. 2, the light intensity adjusting patterns 150 are separated from the adhering layer 170 (i.e. an adhesive). As the consequently, the light adjusting functions (e.g. light-absorbing function or the light-reflecting function) of the light intensity adjusting patterns 150 will not be influenced by the adhering layer 170. However, after the light beam is transmitted through the light guide plate 110 and the transparent layer 130, the light beam is directed upwardly from the whole transparent layer 130. When the light beam is transmitted through the adhering layer 170, the intensity of the light beam is diminished by the adhering layer 170. Under this circumstance, the luminous efficacy of the luminous keyboard device is deteriorated.

Therefore, there is a need of providing a backlight module, in which the luminous efficacy is not adversely affected by the adhesive.

SUMMARY OF THE INVENTION

The present invention provides a backlight module, in which the luminous efficacy is not adversely affected by the adhesive.

In accordance with an aspect of the present invention, there is provided a background module. The background module includes a light-emitting element, a light guide plate, and a light shielding structure. The light-emitting element is used for emitting a light beam. The light guide plate has a sidewall for receiving the light beam. The light beam is guided by the light guide plate to be transferred within the light guide plate. The light-emitting element is located near the sidewall. The light guide plate includes a first reflective material layer. The first reflective material layer is disposed on a top surface of the light guide plate and located near the sidewall. The light shielding structure is disposed over the first reflective material layer for absorbing the light beam and preventing from leakage of the light beam. When the light beam is projected on the first reflective material layer, a portion of the light beam is reflected back into the light guide plate by the first reflective material layer, and another portion of the light beam is transmitted through the first reflective material layer and absorbed by the light shielding structure.

The above objects and advantages of the present invention will become more readily apparent to those ordinarily skilled in the art after reviewing the following detailed description and accompanying drawings, in which:

BRIEF DESCRIPTION OF THE DRAWINGS

FIG. 3 is a schematic side view illustrating a backlight module according to a first embodiment of the present invention;

FIG. 4 is a schematic side view illustrating a backlight module according to a second embodiment of the present invention; and FIG. 5 is a schematic side view illustrating a backlight module according to a third embodiment of the present invention.

Figure 1:
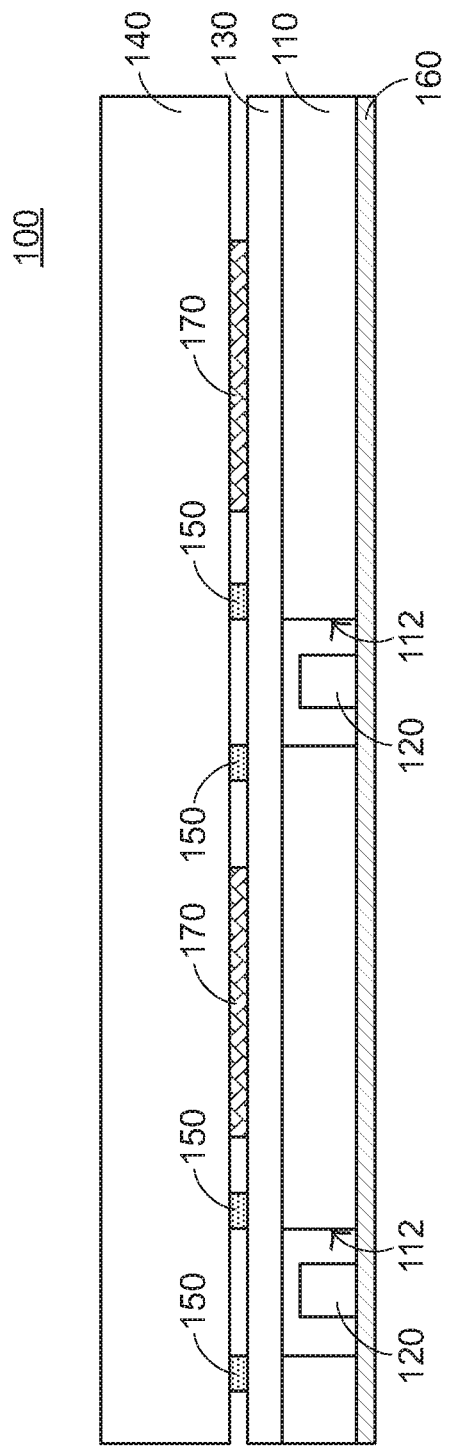
FIG. 1 is a schematic side view illustrating a conventional luminous keyboard device.
Figure 2:
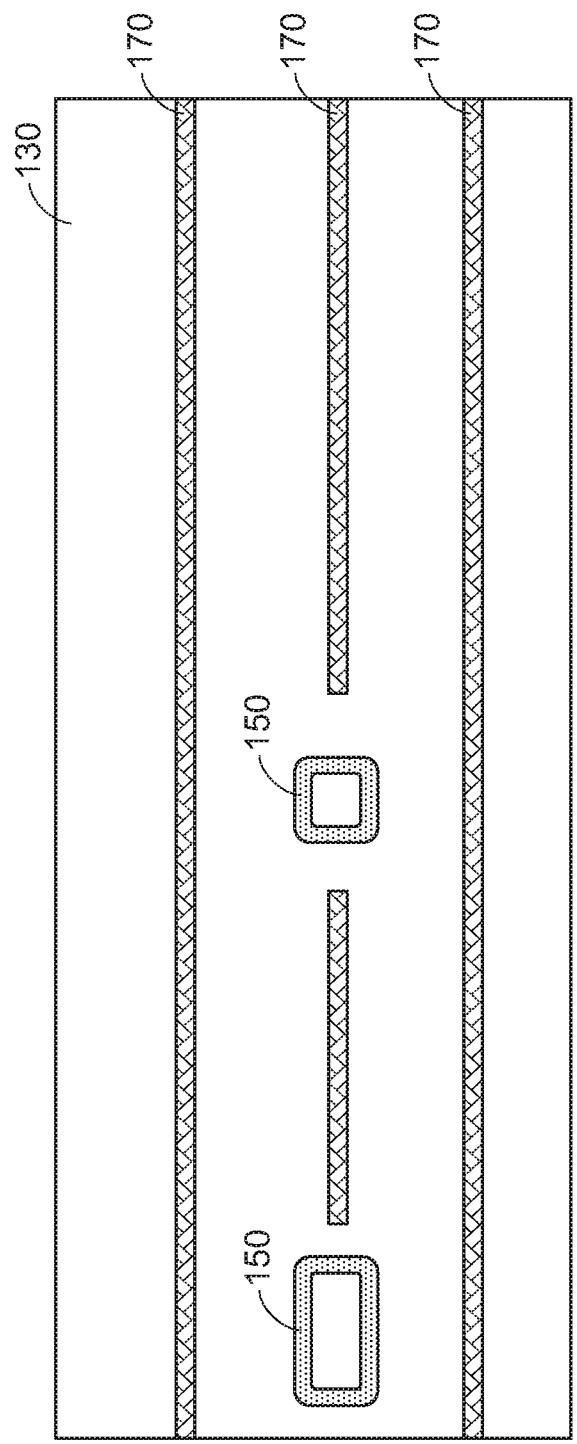
FIG. 2 is a schematic top view illustrating the transparent layer, the light intensity adjusting patterns and the adhering layer of the conventional luminous keyboard device as shown in FIG. 1.

DETAILED DESCRIPTION OF THE
PREFERRED EMBODIMENT

For eliminating the drawbacks encountered from the prior art technology, the present invention provides a backlight module. FIG. 3 is a schematic side view illustrating a backlight module according to a first embodiment of the present invention. As shown in FIG. 3, the backlight module 2 comprises plural light-emitting elements 20, a light guide plate 21, a light shielding structure 22, and an illumination circuit board 23. For clarification and brevity, only one light-emitting element 20 is shown in the drawing. The light guide plate 21 comprises a sidewall 211, a first reflective material layer 212, and a reflecting ink layer 213. The sidewall 211 is located at a lateral edge 214 of the light guide plate 21. The plural light-emitting elements 20 are located near the sidewall 211. The functions of the first reflective material layer 212 and the reflecting ink layer 213 will be described later. The illumination circuit board 23 is located beside the lateral edge 214 of the light guide plate 21 and fixed on the reflecting ink layer 213. The illumination circuit board 23 is used for supporting the plural light-emitting elements 20 and providing electric power to drive the plural light-emitting elements 20. After the plural light-emitting elements 20 are driven to generate light beams B, the light beams B are received by the sidewall 211, and introduced into the light guide plate 21. The light beams B are guided by the light guide plate 21 and transferred within the light guide plate 21. In this embodiment, the light-emitting elements 20 are side-view light-emitting diodes. The illumination circuit board 23 is a flexible printed circuit (FPC) board, which is made of a soft material. Moreover, the illumination circuit board 23 is fixed on the reflecting ink layer 213 by adhering means.

In this embodiment, the first reflective material layer 212 is disposed on a top surface 215 of the light guide plate 21, and located near the sidewall 211. By the first reflective material layer 212, the portion of the light beams B from the top surface 215 of the light guide plate 21 is reflected back into the light guide plate 21. The reflecting ink layer 213 is disposed on a bottom surface 216 of the light guide plate 21. By the reflecting ink layer 213, the portion of the light beams B from the bottom surface 216 of the light guide plate 21 is reflected back into the light guide plate 21. In this embodiment, each of the first reflective material layer 212 and the reflecting ink layer 213 is formed by a sputtering process, a transfer printing process or an evaporation process. Alternatively, each of the first reflective material layer 212 and the reflecting ink layer 213 is produced by firstly performing a coating process (e.g. a spray coating process or a printing process) and then performing a curing process (e.g. a baking process, an infrared curing process or a UV curing process). Moreover, the light guide plate 21 comprises plural light-guiding parts (not shown) for guiding the light beams B to be directed upwardly. The structures of the light-guiding parts and the operations of the light-guiding parts for guiding the light beams B are well known to those skilled in the art, and are not redundantly described herein.

The light shielding structure 22 is disposed over the first reflective material layer 212, and located near the plural light-emitting elements 20. The light shielding structure 22 is used for absorbing the light beams B and preventing from leakage of the light beams B. Moreover, the light shielding structure 22 is fixed on the first reflective material layer 212 via an adhesive 24. That is, the light shielding structure 22 is disposed over the plural light-emitting elements 20. In addition, by the light shielding structure 22, the plural light-emitting elements 20 are isolated from being contacted with external liquid (e.g. water). Consequently, the possibility of causing breakdown of the plural light-emitting elements 20 by the external liquid will be minimized. Moreover, the light shielding structure 22 comprises a light-absorbing ink layer 221. The light-absorbing ink layer 221 is used for absorbing the light beams B and preventing from leakage of the light beams B. In this embodiment, the light shielding structure 22 is a waterproof Mylar sheet, which is disposed over the first reflective material layer 212. Moreover, the light-absorbing ink layer 221 is a black ink layer. In this embodiment, the black ink layer is formed on a top surface of the light shielding structure 22 by a sputtering process, a transfer printing process or an evaporation process. Alternatively, the black ink layer is formed on the top surface of the light shielding structure 22 by firstly performing a coating process (e.g. a spray coating process or a printing process) and then performing a curing process (e.g. a baking process, an infrared curing process or a UV curing process). Alternatively, in some other embodiments, the black ink layer is formed on a bottom surface of the light shielding structure.

Please refer to FIG. 3 again. The plural light-emitting elements 20 are disposed on the illumination circuit board 23, and located beside the lateral edge 214 of the light guide plate 21. After the plural light-emitting elements 20 are driven to generate light beams B, the light beams B are introduced into the light guide plate 21 through the lateral edge 214 of the light guide plate 21, and the light beams B are transferred within the light guide plate 21. When the light beam B is projected on the first reflective material layer 212, a portion of the light beam B is reflected back into the light guide plate 21 by the first reflective material layer 212. Consequently, the light beam B is subjected to total internal reflection within the light guide plate 21. Under this circumstance, only a small fraction of the light beam B is directed to the light shielding structure 22. On the other hand, another portion of the light beam B is transmitted through the first reflective material layer 212, and projected on the light shielding structure 22, so that the light beam B is absorbed by the light shielding structure 22. Consequently, the light intensity of the backlight module 2 at the positions near the light sources (i.e. the plural light-emitting elements 20) will not be too strong. Moreover, when the light beam B transferred within the light guide plate 21 by the total internal reflection is projected on the reflecting ink layer 213, the light beam B is reflected back into the light guide plate 21. Under this circumstance, the possibility of leaking the light beam B from the light guide plate 21 is minimized, and thus the utilization efficacy of the light beam B is enhanced.

From the above discussions about the backlight module 2, the light beam B is firstly reflected by first reflective material layer 212, so that the fraction of the light beam B to be directed to the light shielding structure 22 is reduced. Then, the small portion of the light beam B is absorbed by the light shielding structure 22, so that the possibility of leaking the light beam B is minimized. Under this circumstance, the luminous efficacy is more uniform. Moreover, due to the arrangement of the first reflective material layer 212, only a small fraction of the light beam B is directed to the adhesive 24. Consequently, the influence of the adhesive 24 on the light beam B is largely reduced. Moreover, in the backlight module 2 of this embodiment, the adhesive 24 is only disposed under the light shielding structure 22 and located near the light-emitting elements 20. Consequently, while the light beam B is directly upwardly, the light beam B is not blocked by the adhesive 24. In other words, the luminous efficacy of the backlight module 2 is not adversely affected by the adhesive 24.

Moreover, the first reflective material layer 212 is formed by a sputtering process, a transfer printing process or an evaporation process, or the first reflective material layer 212 is produced by firstly performing a coating process and then performing a curing process. Consequently, there is no air layer between the first reflective material layer 212 and the light guide plate 21. Since the light beam B is not leaked out through the air layer, the light transferring efficiency is enhanced. Similarly, the reflecting ink layer 213 is formed by a sputtering process, a transfer printing process or an evaporation process, or the first reflective material layer 212 is produced by firstly performing a coating process and then performing a curing process. Consequently, there is no air layer between the reflecting ink layer 213 and the light guide plate 21. Since the light beam B is not leaked out through the air layer, the light transferring efficiency is enhanced. Moreover, since the first reflective material layer 212 and the reflecting ink layer 213 are produced by the above processes, the backlight module of the present invention is thinner than the conventional backlight module with multilayered stacked structures. In other words, the backlight module of the present invention is suitable to be used in a display device, a luminous input device or any other appropriate electronic device.

The present invention further provides a backlight module according to a second embodiment of the present invention. FIG. 4 is a schematic side view illustrating a backlight module according to a second embodiment of the present invention. As shown in FIG. 4, the backlight module 3 comprises plural light-emitting elements 30, a light guide plate 31, a light shielding structure 32, and an illumination circuit board 33. For clarification and brevity, only two light-emitting elements 30 are shown in the drawing. The light guide plate 31 comprises a sidewall 311, plural openings 312, a first reflective material layer 313, and a reflecting ink layer 314. For clarification and brevity, only one opening 312 is shown in the drawing.

Except for the following two items, the structures and the operations of the backlight module 3 of this embodiment are substantially identical to those of the backlight module 2 of the first embodiment, and are not redundantly described herein.

Firstly, the light guide plate 31 further comprises plural openings 312. Each opening 312 is aligned with two light-emitting elements 30. The sidewall 311 is located at a periphery of the opening 312. The illumination circuit board 33 is disposed under the light guide plate 31 and fixed on the reflecting ink layer 314. The illumination circuit board 33 is used for supporting the plural light-emitting elements 30. Consequently, every two light-emitting elements 30 are inserted into the corresponding opening 312. After the plural light-emitting elements 30 are driven by the illumination circuit board 33 to generate light beams B, the light beams B are introduced into the light guide plate 31 through the periphery of the opening 312.

Secondly, the light shielding structure 32 is disposed over the plural light-emitting elements 30, and the plural openings 312 are covered by the light shielding structure 32. By the light shielding structure 32, the plural light-emitting elements 30 are isolated from being contacted with external liquid. In this embodiment, the light shielding structure 32 is a black waterproof Mylar sheet. Consequently, it is not necessary to install an additional light-absorbing ink layer on the light shielding structure 32.

The present invention further provides a backlight module according to a third embodiment of the present invention. FIG. 5 is a schematic side view illustrating a backlight module according to a third embodiment of the present invention. As shown in FIG. 5, the backlight module 4 comprises plural light-emitting elements 40, a light guide plate 41, a light shielding structure 42, an illumination circuit board 43, and a waterproof structure 44. For clarification and brevity, only two light-emitting elements 40 are shown in the drawing. The light guide plate 41 comprises a sidewall 411, plural openings 412, a first reflective material layer 413, a second reflective material layer 414, and a reflecting ink layer 415. For clarification and brevity, only one opening 412 is shown in the drawing. In this embodiment, the first reflective material layer 413 is disposed on a top surface 416 of the light guide plate 41, and located near the sidewall 411. By the first reflective material layer 413, the portion of the light beams B from the top surface 416 of the light guide plate 41 is reflected back into the light guide plate 41. The second reflective material layer 414 is disposed on a bottom surface 417 of the light guide plate 41. By the second reflective material layer 414, the portion of the light beams B from the bottom surface 417 of the light guide plate 41 is reflected back into the light guide plate 41. The reflecting ink layer 415 is disposed on the second reflective material layer 414. The portion of the light beams B which is transmitted through the second reflective material layer 414 is reflected back into the light guide plate 41 by the reflecting ink layer 415. In this embodiment, each of the first reflective material layer 413, the second reflective material layer 414 and the reflecting ink layer 415 is formed by a sputtering process, a transfer printing process or an evaporation process. Alternatively, each of the first reflective material layer 413, the second reflective material layer 414 and the reflecting ink layer 415 is produced by firstly performing a coating process and then performing a curing process. The approaches of firstly performing the coating process and then performing the curing process are similar to those of the above embodiments, and are not redundantly described herein.

In this embodiment, each of the first reflective material layer 413 and the second reflective material layer 414 is produced by firstly performing a spray coating process and then performing a UV curing process. Moreover, the first reflective material layer 413 and the second reflective material layer 414 are made of the same material. The reflecting ink layer 415 is formed by a transfer printing process. Moreover, the reflecting ink layer 415 and the second reflective material layer 414 are made of different materials. Of course, the ways of forming the first reflective material layer, the second reflective material layer and the reflecting ink layer are not restricted to the same process, and the first reflective material layer and the second reflective material layer are not restricted to be made of the same material. For example, in some other embodiments, the first reflective material layer and the second reflective material layer are produced by different forming processes, and the first reflective material layer and the second reflective material layer may be made of different materials. Under this circumstance, the reflecting ink layer is produced by the same forming process as the first reflective material layer or the second reflective material layer. However, the reflecting ink layer and the second reflective material layer should be made of different materials in order to prevent from mixing of the reflecting ink layer and the second reflective material layer.

Each opening 412 is aligned with two light-emitting elements 40. The sidewall 411 is located at a periphery of the opening 412. The illumination circuit board 43 is disposed under the light guide plate 41 and fixed on the reflecting ink layer 415. The illumination circuit board 43 is used for supporting the plural light-emitting elements 40. Consequently, every two light-emitting elements 40 are inserted into the corresponding opening 412. After the plural light-emitting elements 40 are driven by the illumination circuit board 43 to generate light beams B, the light beams B are introduced into the light guide plate 41 through the periphery of the opening 412. In this embodiment, the light-emitting elements 40 are side-view light-emitting diodes. The illumination circuit board 43 is a printed circuit board (PCB), which is made of a hard material. Moreover, the illumination circuit board 43 is fixed on the reflecting ink layer 415 by adhering means. It is noted that numerous modifications and alterations of the backlight module 4 may be made while retaining the teachings of the invention. For example, in a variant example, each opening is aligned with one light-emitting element, and the illumination circuit board is made of a flexible printed circuit (FPC) board.

The light shielding structure 42 is disposed over the first reflective material layer 413, and located near the plural light-emitting elements 40. The light shielding structure 42 is used for absorbing the light beams B and preventing from leakage of the light beams B. The waterproof structure 44 is disposed over the light shielding structure 42 and the plural light-emitting elements 40, and the plural openings 412 are covered by the waterproof structure 44. By the waterproof structure 44, the plural light-emitting elements 40 are isolated from being contacted with external liquid. The waterproof structure 44 is fixed on the light shielding structure 42 by an adhesive 45. In this embodiment, the light shielding structure 42 is a black light-absorbing ink layer. The black light-absorbing ink layer is formed on the first reflective material layer 413 by a sputtering process, a transfer printing process or an evaporation process. Alternatively, the black light-absorbing ink layer is firstly formed on the first reflective material layer 413 by a coating process, and then subjected to a curing process. Moreover, the waterproof structure 44 is a waterproof Mylar sheet, which is disposed on the light shielding structure 42.

The operations of the backlight module 4 will be illustrated in more details as follows. After the plural light-emitting elements 40 are driven to generate light beams B, the light beams B are introduced into the light guide plate 41 through the sidewall 411 at the periphery of the opening 412 and transferred within the light guide plate 41. When the light beam B is projected on the first reflective material layer 413, a portion of the light beam B is reflected back into the light guide plate 41 by the first reflective material layer 413. Consequently, the light beam B is subjected to total internal reflection within the light guide plate 41. Under this circumstance, only a small fraction of the light beam B may be directed to the light shielding structure 42. On the other hand, another portion of the light beam B is transmitted through the first reflective material layer 413 and projected on the light shielding structure 42, so that the light beam B is absorbed by the light shielding structure 42. Consequently, the light intensity of the backlight module 4 at the positions near the light sources will not be too strong.

Moreover, when the light beam B transferred within the light guide plate 41 by the total internal reflection is projected on the second reflective material layer 414, the light beam B is reflected back into the light guide plate 41 by the second reflective material layer 414. Under this circumstance, the possibility of leaking the light beam B out of the light guide plate 41 is minimized. Consequently, the utilization efficacy of the light beam B is enhanced, and the fraction of the light beam B to be projected to the reflecting ink layer 415 is largely reduced. When the portion of the light beam B transmitted through the second reflective material layer 414 is projected on the reflecting ink layer 415, the light beam B is reflected back into the light guide plate 41 by the reflecting ink layer 415. Consequently, the utilization efficacy of the light beam B is further enhanced.

From the above discussions, the backlight module 4 comprises two reflecting mechanisms on the bottom surface 417 of the light guide plate 41. That is, the light beam B is firstly reflected by the second reflective material layer 414, and then the portion of the light beam B which is not reflected by the second reflective material layer 414 is reflected by the reflecting ink layer 415. Consequently, the utilization efficacy of the light beam B is largely enhanced From the above descriptions, the present invention provides a backlight module. In the backlight module, a first reflective material layer is firstly used for reflecting the light beam, so that the fraction of the light beam to be directed to the light shielding structure is reduced. Then, the small portion of the light beam is absorbed by the light shielding structure, so that the possibility of leaking the light beam is minimized. Under the circumstance, the light intensity of the backlight module at the positions near the light sources will not be too strong, and the luminous efficacy is more uniform. Moreover, the first reflective material layer is formed by a sputtering process, a transfer printing process or an evaporation process, or the first reflective material layer is produced by firstly performing a coating process and then performing a curing process. Consequently, there is no air layer between the first reflective material layer and the light guide plate. Since the light beam is not leaked out through the air layer, the light transferring efficiency is enhanced. Moreover, the backlight module of the present invention is thinner than the conventional backlight module. Moreover, since the first reflective material layer is disposed on the light guide plate, a great portion of the light beam is reflected by the first reflective material layer and unable to be transmitted through the first reflective material layer. Moreover, since the light beam can be guided to specified regions (e.g. the regions with the light-guiding parts) and directly upwardly, the adhesive can be coated on the whole area of the first reflective material layer. Moreover, since the adhesive and the first reflective material layer are away from the specified regions, the portion of the light beam which is directly upwardly is not adversely affected by the adhesive.

While the invention has been described in terms of what is presently considered to be the most practical and preferred embodiments, it is to be understood that the invention needs not be limited to the disclosed embodiment. On the contrary, it is intended to cover various modifications and similar arrangements included within the spirit and scope of the appended claims which are to be accorded with the broadest interpretation so as to encompass all such modifications and similar structures.

What is claimed is:

1. A background module, comprising:
a light-emitting element for emitting a light beam;
a light guide plate having a sidewall for receiving the light beam, wherein the light beam is guided by the light guide plate to be transferred within the light guide plate, wherein the light-emitting element is located near the sidewall, and the light guide plate comprises a first reflective material layer, wherein the first reflective material layer is disposed on a top surface of the light guide plate and located near the sidewall; and
a light shielding structure disposed over the first reflective material layer for absorbing the light beam and preventing from leakage of the light beam, wherein when the light beam is projected on the first reflective material layer, a portion of the light beam is reflected back into the light guide plate by the first reflective material layer, and another portion of the light beam is transmitted through the first reflective material layer and absorbed by the light shielding structure; wherein the light guide plate further comprises:
a second reflective material layer disposed on a bottom surface of the light guide plate for reflecting the light beam back into the light guide plate; and the background module further comprising:
a reflecting ink layer disposed on the second reflective material layer, wherein when a portion of the light beam is transmitted through the second reflective material layer, the portion of the light beam is reflected back into the light guide plate by the reflecting ink layer, further comprising an illumination circuit board, wherein the illumination circuit board is disposed under the light guide plate and fixed on the reflecting ink layer for supporting the light-emitting element and providing electric power to drive the light-emitting element, wherein the light-emitting element is inserted into an opening of the light guide plate, and the sidewall of the light guide plate is located at a periphery of the opening, so that the light beam from the light-emitting element is introduced into the light guide plate through the periphery of the opening.

2. The background module according to claim 1, wherein the first reflective material layer is formed on the top surface of the light guide plate by a sputtering process, a transfer printing process or an evaporation process, or formed on the top surface of the light guide plate by a coating process or a curing process, wherein the second reflective material layer is formed on the bottom surface of the light guide plate by the sputtering process, the transfer printing process or the evaporation process, or formed on the bottom surface of the light guide plate by the coating process or the curing process, wherein the reflecting ink layer is formed on the second reflective material layer by the sputtering process, the transfer printing process or the evaporation process, or formed on the second reflective material layer by the coating process or the curing process, wherein the coating process comprises a spray coating process or a printing process, and the curing process comprises a baking process, an infrared curing process or a UV curing process, wherein the second reflective material layer and the reflecting ink layer are made of different materials.

3. The background module according to claim 1, wherein the illumination circuit board is a printed circuit board (PCB) made of a hard material or a flexible printed circuit (FPC) board made of a soft material.

4. The background module according to claim 1, further comprising a waterproof structure, wherein the waterproof structure is disposed over the light shielding structure and the light-emitting element for isolating the light-emitting element from being contacted with external liquid, wherein the waterproof structure is fixed on the light shielding structure via an adhesive.

5. The background module according to claim 4, wherein the waterproof structure is a waterproof Mylar sheet, and the light shielding structure is a light-absorbing ink layer, wherein the light-absorbing ink layer is formed on the first reflective material layer by a sputtering process, a transfer printing process or an evaporation process, or formed on the first reflective material layer by a coating process or a curing process, wherein the coating process comprises a spray coating process or a printing process, and the curing process comprises a baking process, an infrared curing process or a UV curing process, wherein the light-absorbing ink layer and the first reflective material layer are made of different materials.

6. The background module according to claim 1, wherein the light shielding structure is a black waterproof Mylar sheet, and the light shielding structure is disposed over the light-emitting element for isolating the light-emitting element from being contacted with external liquid, wherein the light shielding structure is fixed on the first reflective material layer via an adhesive.

7. The background module according to claim 1, wherein the light shielding structure is a waterproof Mylar sheet, and the light shielding structure is disposed over the light-emitting element for isolating the light-emitting element from being contacted with external liquid, wherein the light shielding structure further comprises a light-absorbing ink layer, and the light-absorbing ink layer is formed on the top surface of the light guide plate by a sputtering process, a transfer printing process or an evaporation process, or formed on a top surface or a bottom surface of the light shielding structure by a coating process or a curing process, wherein the coating process comprises a spray coating process or a printing process, and the curing process comprises a baking process, an infrared curing process or a UV curing process, wherein the light shielding structure is fixed on the first reflective material layer via an adhesive.

8. The background module according to claim 1, wherein the light shielding structure is a waterproof Mylar sheet, and the light shielding structure is disposed over the light-emitting element for isolating the light-emitting element from being contacted with external liquid, wherein the light shielding structure further comprises a light-absorbing ink layer, and the light-absorbing ink layer is formed on the top surface of the light guide plate by a sputtering process, a transfer printing process or an evaporation process, or formed on a top surface or a bottom surface of the light shielding structure by a coating process or a curing process, wherein the coating process comprises a spray coating process or a printing process, and the curing process comprises a baking process, an infrared curing process or a UV curing process, wherein the light shielding structure is fixed on the first reflective material layer via an adhesive.

9. A background module, comprising:
a light-emitting element for emitting a light beam;
a light guide plate having a sidewall for receiving the light beam, wherein the light beam is guided by the light guide plate to be transferred within the light guide plate, wherein the light-emitting element is located near the sidewall, and the light guide plate comprises a first reflective material layer, wherein the first reflective material layer is disposed on a top surface of the light guide plate and located near the sidewall; and
a light shielding structure disposed over the first reflective material layer for absorbing the light beam and preventing from leakage of the light beam, wherein when the light beam is projected on the first reflective material layer, a portion of the light beam is reflected back into the light guide plate by the first reflective material layer, and another portion of the light beam is transmitted through the first reflective material layer and absorbed by the light shielding structure; wherein the light guide plate further comprises a reflecting ink layer, and the reflecting ink layer is disposed on a bottom surface of the light guide plate for reflecting the light beam back into the light guide plate, wherein the first reflective material layer is formed on the top surface of the light guide plate by a sputtering process, a transfer printing process or an evaporation process, or formed on the top surface of the light guide plate by a coating process or a curing process, wherein the reflecting ink layer is formed on the bottom surface of the light guide plate by the sputtering process, the transfer printing process or the evaporation process, or formed on the bottom surface of the light guide plate by the coating process or the curing process, wherein the coating process comprises a spray coating process or a printing process, and the curing process comprises a baking process, an infrared curing process or a UV curing process; and the background module further comprising an illumination circuit board, wherein the illumination circuit board is disposed under the light guide plate and fixed on the reflecting ink layer for supporting the light-emitting element and providing electric power to drive the light-emitting element, wherein the light-emitting element is inserted into an opening of the light guide plate, and the sidewall of the light guide plate is located at a periphery of the opening, so that the light beam from the light-emitting element is introduced into the light guide plate through the periphery of the opening.

10. The background module according to claim 9, further comprising a waterproof structure, wherein the waterproof structure is disposed over the light shielding structure and the light-emitting element for isolating the light-emitting element from being contacted with external liquid, wherein the waterproof structure is fixed on the light shielding structure via an adhesive.

11. The background module according to claim 9, wherein the waterproof structure is a waterproof Mylar sheet, and the light shielding structure is a light-absorbing ink layer, wherein the light-absorbing ink layer is formed on the first reflective material layer by a sputtering process, a transfer printing process or an evaporation process, or formed on the first reflective material layer by a coating process or a curing process, wherein the coating process comprises a spray coating process or a printing process, and the curing process comprises a baking process, an infrared curing process or a UV curing process, wherein the light-absorbing ink layer and the first reflective material layer are made of different materials.

12. The background module according to claim 9, wherein the light shielding structure is a black waterproof Mylar sheet, and the light shielding structure is disposed over the light-emitting element for isolating the light-emitting element from being contacted with external liquid, wherein the light shielding structure is fixed on the first reflective material layer via an adhesive.

\* \* \* \* \*